US010983885B2

(12) United States Patent
Cagno et al.

(10) Patent No.: US 10,983,885 B2
(45) Date of Patent: Apr. 20, 2021

(54) RECOVERING STORAGE DEVICES IN A STORAGE ARRAY HAVING ERRORS

(71) Applicant: INTERNATIONAL BUSINESS MACHINES CORPORATION, Armonk, NY (US)

(72) Inventors: Brian J. Cagno, Tucson, AZ (US); John C. Elliott, Tucson, AZ (US); Matthew G. Borlick, Tucson, AZ (US); Will A. Wright, Tucson, AZ (US); Lokesh M. Gupta, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 109 days.

(21) Appl. No.: 16/204,658

(22) Filed: Nov. 29, 2018

(65) Prior Publication Data
US 2020/0174900 A1    Jun. 4, 2020

(51) Int. Cl.
*G06F 11/20* (2006.01)
*G06F 3/06* (2006.01)
*G06F 11/10* (2006.01)

(52) U.S. Cl.
CPC .......... *G06F 11/2094* (2013.01); *G06F 3/065* (2013.01); *G06F 3/0619* (2013.01); *G06F 3/0689* (2013.01); *G06F 11/1092* (2013.01); *G06F 2201/82* (2013.01)

(58) Field of Classification Search
CPC ............ G06F 11/1092; G06F 11/2094; G06F 3/0619; G06F 3/0689; G06F 3/065; G06F 2201/82
See application file for complete search history.

(56) References Cited

U.S. PATENT DOCUMENTS

| 8,880,801 | B1 | 11/2014 | Robins et al. | |
|---|---|---|---|---|
| 2005/0076157 | A1* | 4/2005 | Serizawa | G06F 3/0635 710/1 |
| 2006/0010352 | A1* | 1/2006 | Mukherjee | G06F 11/079 714/47.2 |
| 2007/0101187 | A1* | 5/2007 | Daikokuya | G06F 11/1088 714/6.22 |
| 2007/0109883 | A1* | 5/2007 | Elliott | G06F 3/0605 365/200 |
| 2012/0096306 | A1* | 4/2012 | Akirav | G06F 11/1415 714/6.2 |

(Continued)

*Primary Examiner* — Yolanda L Wilson
(74) *Attorney, Agent, or Firm* — Konrad Kaynes Davda & Victor LLP; David W. Victor; Alan S. Raynes

(57) ABSTRACT

Provided are a computer program product, system, and method for recovering storage devices in a storage array having errors. A determination is made to replace a first storage device in a storage array with a second storage device. The storage array is rebuilt by including the second storage device in the storage array and removing the first storage device from the storage array resulting in a rebuilt storage array. The first storage device is recovered from errors that resulted in the determination to replace. Data is copied from the second storage device included in the rebuilt storage array to the first storage device. The recovered first storage device is swapped into the storage array to replace the second storage device in response to copying the data from the second storage device to the first storage device.

24 Claims, 5 Drawing Sheets

(56) References Cited

U.S. PATENT DOCUMENTS

| | | | |
|---|---|---|---|
| 2014/0059308 A1* | 2/2014 | Blea | G06F 11/2069 |
| | | | 711/162 |
| 2014/0089730 A1* | 3/2014 | Watanabe | G06F 11/1092 |
| | | | 714/6.22 |
| 2015/0026517 A1* | 1/2015 | Ben Romdhane | G06F 11/1415 |
| | | | 714/15 |
| 2015/0317223 A1* | 11/2015 | Cho | G06F 11/0727 |
| | | | 714/4.11 |
| 2016/0342476 A1 | 11/2016 | Nazari et al. | |
| 2017/0075762 A1* | 3/2017 | Hendrickson | G06F 3/067 |
| 2017/0090767 A1* | 3/2017 | Poston | G06F 11/16 |
| 2017/0102883 A1* | 4/2017 | Atluri | G06F 3/0689 |
| 2017/0192865 A1 | 7/2017 | Pan | |
| 2018/0121305 A1* | 5/2018 | Kameyama | G06F 11/2094 |
| 2019/0004899 A1* | 1/2019 | Gao | G06F 11/1088 |
| 2019/0129815 A1* | 5/2019 | Gao | G06F 11/2094 |

\* cited by examiner

RECOVERING STORAGE DEVICES IN A STORAGE ARRAY HAVING ERRORS

BACKGROUND OF THE INVENTION

1. Field of the Invention

The present invention relates to a computer program product, system, and method for recovering storage devices in a storage array having errors.

2. Description of the Related Art

A storage array, such as a Redundant Array of Independent Disks (RAID) array, comprises an array of storage devices, where data in a logical volume or unit of data is striped across the storage devices in the array. When a drive (also referred to as storage device) fails in a RAID array, the storage controller or device adaptor managing the RAID array will swap in a new drive and rebuild the RAID array from parity and/or redundancy data along with data on remaining drives. Rebuilding a RAID array is a processor intensive operation which can saturate the processors on the device adapter concurrently managing Input/Output (I/O) requests directed to the drives in the RAID array. A drive determined to fail may then be removed from the system.

There is a need in the art for improved techniques to manage failure of storage devices in a storage array.

SUMMARY

Provided are a computer program product, system, and method for recovering storage devices in a storage array having errors. A determination is made to replace a first storage device in a storage array with a second storage device. The storage array is rebuilt by including the second storage device in the storage array and removing the first storage device from the storage array resulting in a rebuilt storage array. Data is copied from the second storage device included in the rebuilt storage array to the first storage device. The first storage device is swapped into the storage array to replace the second storage device in response to copying the data from the second storage device to the first storage device.

With the above embodiment, an effort is made to recover a storage drive for reuse in the storage array. After immediately swapping out the potentially failed storage device having errors, the potentially failed storage device may be reconfigured to fix the source of the errors by copying data from the rebuilt spare in the storage array to make the potentially failed storage device consistent with the user and parity data in the storage (RAID) array. Thus, the potentially failed storage device may be tested and reconfigured without interfering with storage array operations and after validated may be immediately swapped into the storage array for the spare storage device. By reducing latency in returning a recovered potentially failed storage device to the storage array, all the storage drives in the array maintain a similar estimated life span and writes to the spare storage are minimized to maintain its very low wear and use to optimize its continued usefulness as a spare.

In a further embodiment, that may be optionally combined with any of the other embodiments described herein, the second storage device is designated a spare to be available to replace a failed storage device in the storage array when included in the storage array to replace the first storage device. The second storage device is indicated as in use in the rebuilt storage array. The second storage device is indicated as a spare in response to the swapping the first storage device for the second storage device in the storage array.

With the above embodiment, the second storage device, which was initially a spare, returns to spare status after being swapped out of the storage array by the recovered storage device to continue to be available as a spare. Further, because the spare storage device included in the rebuilt array is only operable in the array while the data is copied to the second storage device, when returned as a spare, the spare storage device will only have had a limited amount of wear while in the storage array.

In a further embodiment, that may be optionally combined with any of the other embodiments described herein, operability of the first storage device is validated in response to copying the data from the second storage device. The swapping of the first storage device for the second storage device in the storage array is performed in response to validating the operability of the first storage device.

With the above embodiment, the potentially failed storage device may be swapped back into the array to return the spare storage device to spare status after having its operability verified as part of the copying of the data from the spare storage device to the potentially failed storage device. This ensures when returned to the storage array, the potentially failed storage device has been verified as operable.

In a further embodiment, that may be optionally combined with any of the other embodiments described herein, determining to replace the first storage device comprises determining whether a detected error at the first storage device is a fatal error or non-fatal error. The rebuilding the storage array, copying data from the second storage device and the swapping the first storage device into the storage array to replace the second storage device are performed in response to determining that the detected error is a non-fatal error. The first storage device is failed in response to determining that the detected error is a fatal error.

With the above embodiment, only storage devices having non-fatal errors are eligible for recovery, because only such storage devices with errors are recoverable.

In a further embodiment, that may be optionally combined with any of the other embodiments described herein, an error is detected at the first storage device and a determination is made as to whether the detected error comprises a fatal error from which the first storage device cannot be recovered or a non-fatal error from which the first storage device has an opportunity to be recovered. A number of non-fatal errors is incremented in response to determining that the detected error comprises a non-fatal error. A determination is made as to whether the number of non-fatal errors exceeds a non-fatal error threshold. The rebuilding the storage array, the copying data from the second storage device, and the swapping the first storage device into the storage array to replace the second storage device are performed in response to determining that the number of non-fatal errors is less than the non-fatal error threshold. The first storage device is failed in response to determining that the number of non-fatal errors is greater than the non-fatal error threshold.

With the above embodiments, storage devices having non-fatal errors exceeding a threshold are presumed to be unusable and not suitable for returning to the storage array, and so are failed. Storage drives having less than the threshold number of non-fatal errors are considered as eligible candidates for recovery because such a below threshold non-fatal error rate is considered within the range of normal operability that can be corrected.

In a further embodiment, that may be optionally combined with any of the other embodiments described herein, a non-fatal error is detected by determining at least one of: that a response to a command to the first storage device was not provided within a first timeout period in response to the first storage device not having been previously replaced in the storage array with a spare storage device; and that a response to a command to the first storage device was not provided within a second timeout period in response to the first storage device having been previously replaced in the storage array with a spare storage device; wherein the second timeout period is shorter than the first timeout period.

In a further embodiment, that may be optionally combined with any of the other embodiments described herein, the first storage device is reconfigured in response to removing the first storage device from the storage array. The data is copied from the second storage device to the first storage device in response to reconfiguring the first storage device.

With the above embodiment, the data is only copied after the potentially failed storage drive has been reconfigured to place in a potentially fixed and operable state.

In a further embodiment, that may be optionally combined with any of the other embodiments described herein, the reconfiguring the first storage device comprises: maintaining an association of error types with different reconfiguration operations; determining an error type of errors experienced at the first storage device; and determining a reconfiguration operation associated with the determined error type. The reconfiguring the first storage device comprises performing the determined reconfiguration operation.

With the above embodiment, different reconfiguration operations are associated with different error types to provide optimal operations for correcting the specific type of detected non-fatal errors, so that the optimal specific reconfiguration operation can be used to reconfigure and recover the potentially failed storage device to maximize the likelihood the reconfiguration addresses the core cause of the non-fatal errors and results in recovery of the potentially failed storage device.

In a further embodiment, that may be optionally combined with any of the other embodiments described herein, the copying data from the second storage device included in the rebuilt storage array to the first storage device comprises: receiving a write with write data for a storage location in the second storage device configured in the storage array while copying data from the second storage device to the first storage device; writing the write data to the storage location in the second storage device; determining whether write data to write to the storage location was copied to the first storage device; and copying the write data to the first storage device in response to determining that the data for the storage location was copied to the first storage device.

With the above embodiment, while recovering the potentially failed storage device, new writes to the replacement spare storage device in the storage array are copied to the potentially failed storage device to make the potentially failed storage device consistent with the replacement (spare) storage device currently in the storage array to be ready to swap back into the storage array to replace the spare substituted for the potentially failed storage device.

In a further embodiment, that may be optionally combined with any of the other embodiments described herein, the determining whether the data for the storage location was copied to the first storage device comprises: maintaining a bitmap for sections of the second storage device indicating whether the sections have been copied to the first storage device; and setting a bit in the bitmap for a section of the second storage device to indicate copied in response to copying data from the section for the bit to the first storage device. The write data is determined to have been copied to the first storage device in response to determining that the bit in the bitmap for the section including the write data indicates that the section has been copied to the first storage device.

In a further embodiment, that may be optionally combined with any of the other embodiments described herein, the bitmap is processed to determine sections of data in the second storage device to copy to the first storage device for bits indicating that the data has not been copied. Write data is copied in response to determining that a bit for a section including the storage location for the write data indicates that the data was not copied.

In a further embodiment, that may be optionally combined with any of the other embodiments described herein, a copy-in-progress indicator is set to indicate to copy data from the second storage device to the first storage device in response to rebuilding the storage array by including the second storage device and removing the first storage device. A determination is made as to whether the copy-in-progress indicator indicates to copy data in response to receiving the write data. The determining whether the data for the storage location was copied is performed in response to determining that the copy-in-progress indicator indicates to copy. The copy-in-progress indicator is set to indicate not to copy data from the second storage device to the first storage device in response to copying all data to be copied in the second storage device to the first storage device.

DETAILED DESCRIPTION

Storage drives having non-fatal errors may be removed from a storage array even though the drive may be fixable through a firmware update, reformatting, etc. Given the processor intensive nature of a rebuilding operation when swapping in a new storage drive into the RAID array, the removed storage drive may be discarded. In enterprise storage systems, storage drives may be very expensive and removing the drives costly.

Described embodiments provide improvements to computer technology for managing storage drives in a storage array by recovering a storage drive having a threshold number of non-fatal errors for reuse in the storage array. Upon determining to replace a storage device (drive), such as having a threshold number of non-fatal errors, the storage array is rebuilt with the potentially failed storage device removed and replaced with a spare storage device. The potentially failed storage array is reconfigured to attempt to fix. While operable in the storage array, storage array data is copied from the spare storage device to the potentially failed storage device so that the potentially failed storage device may be swapped back into the storage array if validated after the copying. The spare storage drive may be removed from the array and returned to function as a spare storage drive.

Described embodiments provide improvements to computer technology for recovering potentially failed storage drives in a storage array, such as a RAID array, having non-fatal errors without disrupting storage array operations. After immediately swapping out the potentially failed storage device having errors, the potentially failed storage device may be reconfigured to fix the source of the errors by copying data from the rebuilt spare in the storage array to make the potentially failed storage device consistent with the user and parity data in the storage (RAID) array. Thus, the potentially failed storage device may be tested and reconfigured without interfering with storage array operations and after validated may be immediately swapped into the storage array for the spare storage device. By reducing latency in returning a recovered potentially failed storage device to the storage array, all the storage drives in the array maintain a similar estimated life span and writes to the spare storage are minimized to maintain its very low wear and use to optimize its continued usefulness as a spare.

Figure 1:
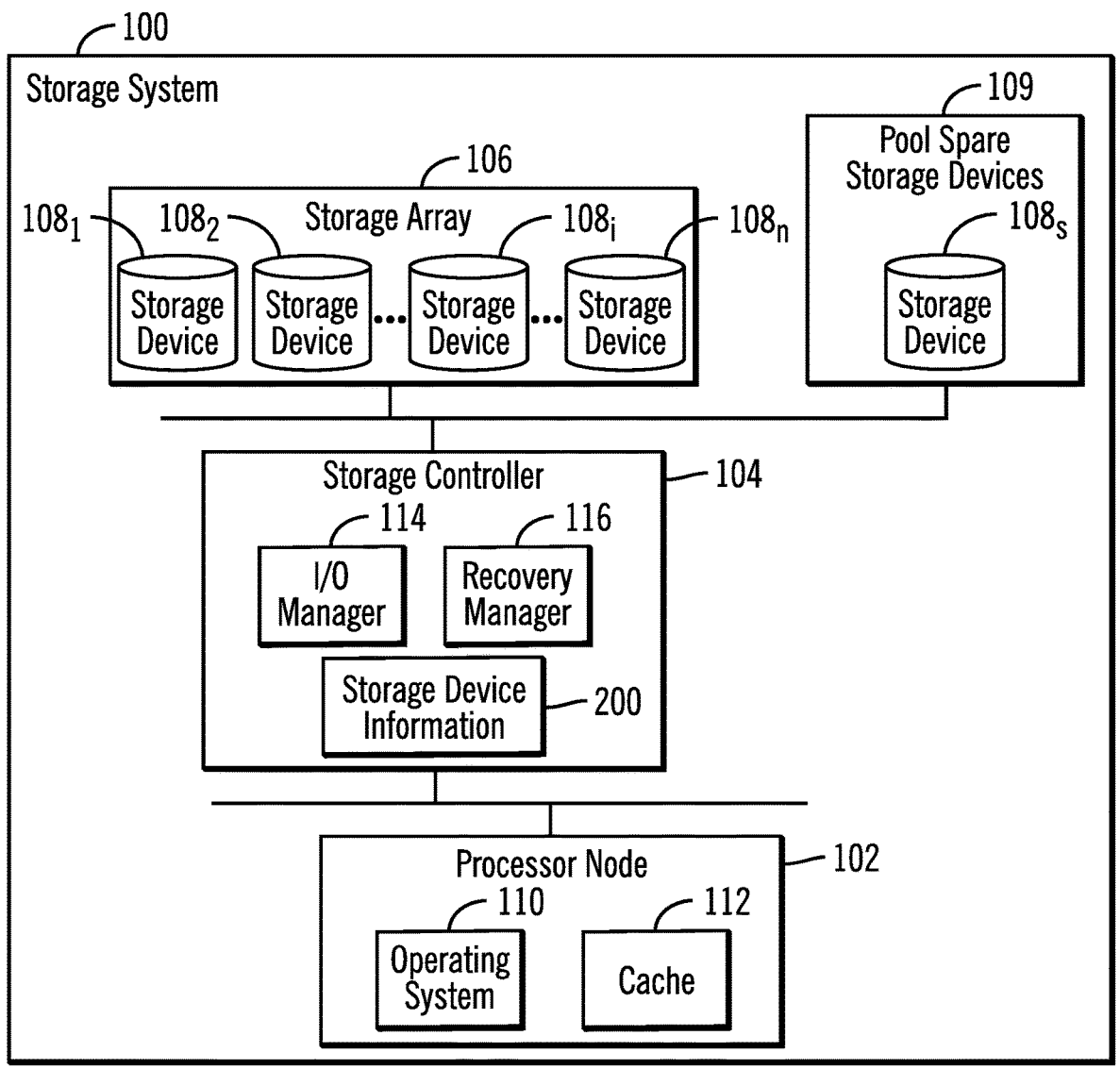
FIG. 1 illustrates an embodiment of a storage environment.

FIG. 1 illustrates an embodiment of a storage system 100 having one or more processor nodes 102 to generate read and write requests to direct to a storage controller 104 to store in a storage array 106 comprising one or more storage devices $108_1$, $108_2$ . . . $108_n$ in which logical volumes and tracks are configured, such as a RAID array. The processor node 102 includes an operating system 110 to manage I/O requests directed to the storage array 106 and a cache 112 to cache data for the storage array 106 for read and write requests to the storage array 106.

The storage controller 104 includes an I/O manager 114 to manage I/O requests from the processor node 102 to the storage array 106 and a recovery manager 116 to recover from a failure at one or more of the storage devices $108_1$, $108_2$ . . . $108_n$. The recovery manager 116 maintains storage device information 200 on the storage devices $108_1$, $108_2$ . . . $108_n$ to manage the replacement of storage devices $108_1$ experiencing errors and that may comprise potentially failed storage devices. In embodiments where one or more RAID arrays, or other logical storage units, are configured in the storage devices $108_1$, $108_2$ . . . $108_n$ the recovery manager 116 may rebuild a RAID array in available storage devices $108_1$, $108_2$ . . . $108_n$, if one or more of the storage devices fail, using parity and/or redundant data to reconstruct data on the failed storage devices $108_1$, $108_2$ . . . $108_n$. A pool of spare storage devices 109 provides spare storage devices $108_S$ to use to replace a failed storage device $108_1$ in the storage array 106. In RAID embodiments, the I/O manager 114 may include RAID algorithms to stripe data across the storage devices $108_1$, $108_2$ . . . $108_n$ and generate parity or redundancy data to stripe data across the storage devices $108_1$, $108_2$ . . . $108_n$, where the parity and/or redundancy data is used if one or more storage devices in which the RAID array 106 is configured fails. Various RAID levels use parity or various forms of redundancy data to recreate data in the event of one or more failures. The term "parity" refers to, without limitation, any form of redundancy data such as XOR parity, Reed-Solomon encoded redundancy data, ECC, etc. that is applicable for a given RAID implementation.

In the embodiment of FIG. 1, one processor node 102, storage controller 104, and storage array 106 are shown. In further embodiments, there may be redundant instances of the computing elements 102, 104, and 106 to allow for failover in the event one of the components fails.

The storage devices $108_1$, $108_2$ . . . $108_n$ in the storage array 106 and pool 109 spare storage devices $108_S$ may comprise different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Volumes in a storage space may further be configured from an array of the storage devices $108_1$, $108_2$ . . . $108_n$, such as Just a Bunch of Disks (JBOD), Direct Access Storage Device (DASD), Redundant Array of Independent Disks (RAID) array, virtualization device, etc. Further, the storage devices $108_1$, $108_2$ . . . $108_n$ and $108_S$ may comprise heterogeneous storage devices from different vendors and different types of storage devices, such as a first type of storage devices, e.g., hard disk drives, tape drives, that have a slower data transfer rate than a second type of storage devices, e.g., SSDs.

The components of the storage controller 104, such as the I/O manager 114 and recovery manager 116, may be implemented in computer readable program instructions in a computer readable storage medium executed by a processor and/or computer hardware, such as an Application Specific Integrated Circuit (ASIC).

Figure 2:
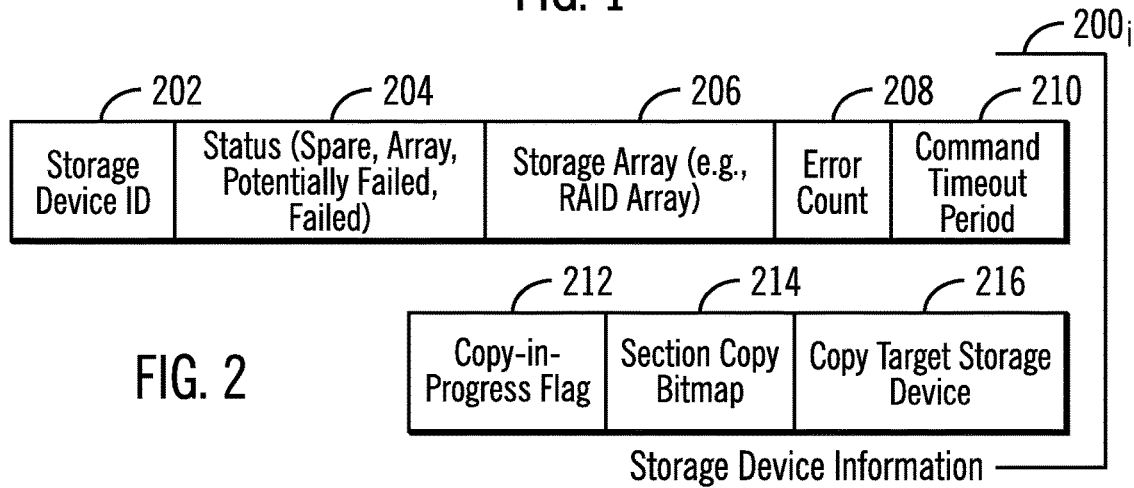
FIG. 2 illustrates an embodiment of storage device information.

FIG. 2 illustrates an embodiment of an instance of storage device information $200_i$ for one of the storage devices $108_1$, $108_2$ . . . $108_n$ in the storage array 106 and spare storage devices $108_S$, and includes a storage device identifier 202 of a storage device $108_i$; a status of the storage device 202, such as the storage device 202 is included in a storage array 206, is functioning as a spare device $108_S$ to be used to replace a potentially failed storage device $108_{PF}$, is a potentially failed storage device $108_{PF}$ that may be recoverable or is failed; the storage array 206 in which the storage device 202 is configured if the status 204 indicates included in a storage array 106; an error count 208 indicating a number of non-fatal errors occurring at the storage device 202; a command timeout period 210 indicating a time that must elapse without responding to a command before a timeout error is indicated; a copy-in-progress flag 212 indicating whether the data in the storage device 202 is to be copied to a copy target storage device 216; and a section copy bitmap 214 indicating whether sections of the storage device 202 that have been copied to the copy target storage device 216.

In one embodiment, there may be an error count 208 for each of a plurality of different types of non-fatal errors for which recovery of the storage device experiencing the errors may be recovered to allow separate tracking for different non-fatal error types.

Figure 3:
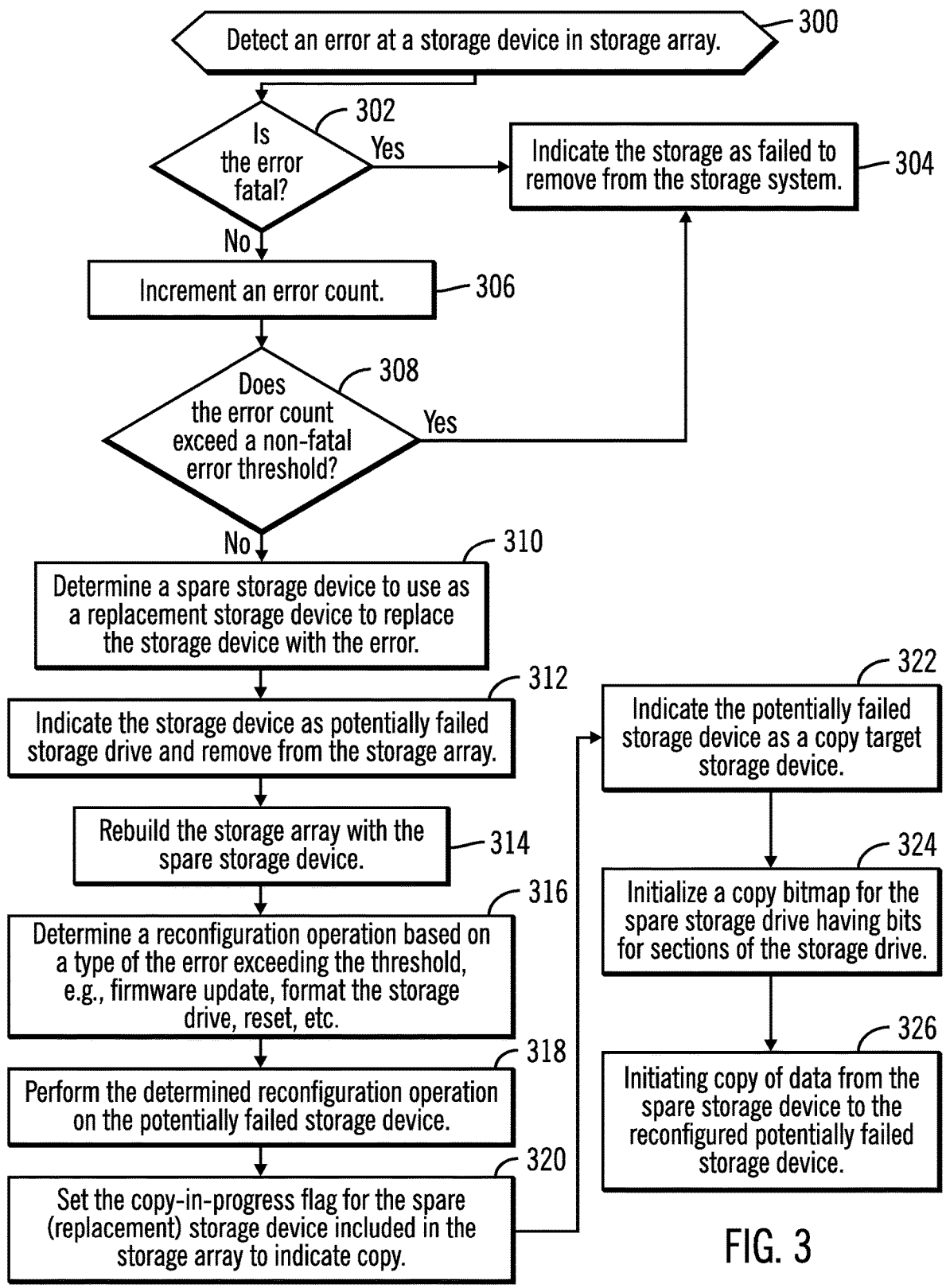
FIG. 3 illustrates an embodiment of operations to process an error detected at a storage device in a storage array.

FIG. 3 illustrates an embodiment of operations performed by the recovery manager 116 to process an error detected at a storage device $108_i$ in the storage array 106. Upon detecting (at block 300) an error at a storage device $108_n$ if (at block 302) the detected error is fatal, such as a hardware failure or the device reaching an end of life threshold, then the storage device $108_i$ is indicated (at block 304) as failed in the status 204 of the storage device information $200_i$ for the storage device $108_i$. Failure handling may then be performed to remove the failed storage device $108_i$ from the storage system 100 and rebuild the storage array 106 with a spare $108_S$. If (at block 302) the error is non-fatal, which means there is a possibility the storage device $108_i$ may be repaired and recoverable through a firmware update, reconfiguration or reset, then an error count 208 is incremented (at block 306). In one embodiment, there may be one error count 208 for all non-fatal errors or separate error counts for different non-fatal error types. If (at block 308) the error count 208 exceeds a non-fatal error threshold, then the storage device $108_i$ is indicated (at block 304) as failed. There may be different non-fatal error thresholds for different non-fatal error types, so a non-fatal error threshold for a specific non-fatal error type is compared with the error count for that specified non-fatal error type that was detected.

If (at block 308) the error count 208 is not exceeded, then the recovery manager 116 determines (at block 310) a spare storage device $108_S$ available to replace the storage device $108_i$ configured in the storage array 106 having less than the threshold number of non-fatal errors. The recovery manager 116 indicates (at block 312) that the storage device $108_i$ experiencing the non-fatal error is a potentially failed storage device $108_{PF}$ in the status field 204. The storage array 106 is rebuilt (at block 314) with the spare storage device $108_S$ as a replacement storage device for the replaced potentially failed storage device $108_{PF}$. After rebuilding, the recovery manager 116 determines (at block 316) a reconfiguration operation based on the error type that caused the exceeding of the error threshold, which may comprise a firmware update, reformatting the storage drive storage medium, reset the storage device $108_{PF}$, etc. There may be different types of reconfiguration operations for different error types to perform a reconfiguration operation, e.g., firmware updating, resetting, intended to address the error detected. The determined reconfiguration operation is performed (at block 318) on the potentially failed storage device $108_{PF}$.

After completing the reconfiguration operation successfully, the recovery manager 116 sets (at block 320) the copy-in-progress flag 212 in the storage device information $200_S$ for the spare (replacement) storage device $108_S$ to indicate to copy. The potentially failed storage device $108_{PF}$ is indicated (at block 322) as the copy target storage device 216 in the spare storage device information $200_S$. A section copy bitmap 214 having a bit for each section of the spare storage device $108_S$ to copy to the copy target storage device 216 is initialized (at block 324) with all bits indicating to copy, such as set to one. A section represented by a bit in the copy bitmap 214 may comprise a track, multiple tracks, a number of storage units, etc. in the storage device 202. The recovery manager 116 initiates (at block 326) copying of data from the spare (replacement) storage device $108_S$ rebuilt into the storage array 106 to the potentially failed (copy target 216) storage device $108_{PF}$. The data copied from the spare storage device $108_S$ to the copy target 216 may comprise user and parity data stored in the spare storage device $108_S$ for the storage array 106.

In a further embodiment, there may be a low threshold error count, such that the low threshold error count must be exceeded before proceeding to block 310 to rebuild with the spare to recover the storage device $108_i$ having the non-fatal error to tolerate a limited number of errors in the storage device $108_i$.

Figure 4:
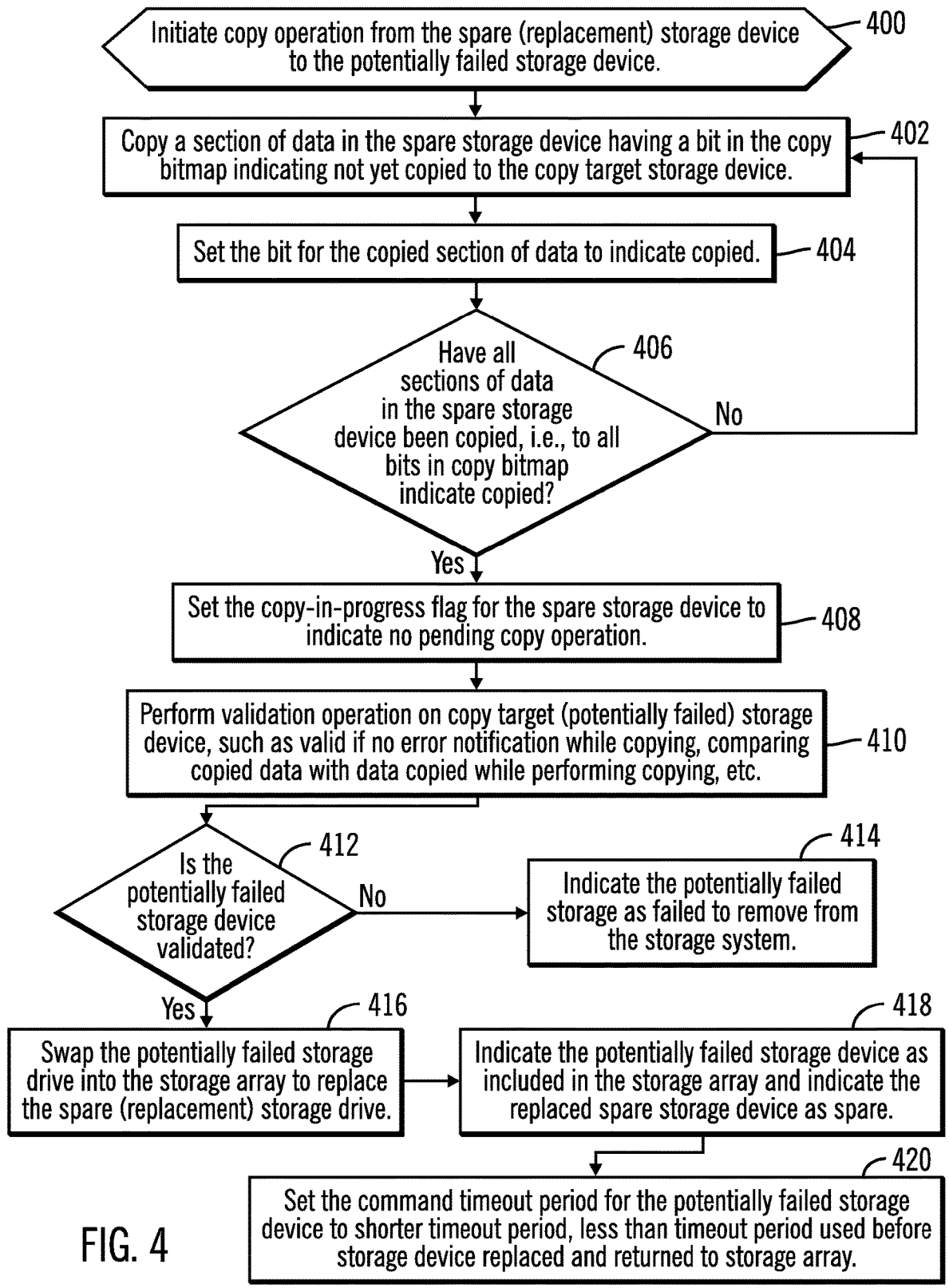
FIG. 4 illustrates an embodiment of operations to copy data from a storage device swapped into the storage array to the replace a potentially failed storage device having errors to recover the potentially failed storage device.

FIG. 4 illustrates an embodiment of operations performed by the recovery manager 116 to copy data from the spare storage device $108_S$ swapped into the storage array 106 for the replaced potentially failed storage device $108_{PF}$, which is initiated at block 326 in FIG. 3. Upon initiating (at block 400) the copy operation, the recovery manager 116 copies (at block 402) a section of data in the spare storage device having a bit in the copy bitmap 214 indicating not yet copied to the copy target (potentially failed) storage device 216. The bit in the copy bitmap 214 for the copied section of data is set (at block 404) to indicate copied. If (at block 406) not all sections of the spare storage device $108_S$ been copied to the copy target storage device $108_{PF}$, then control returns to block 402 to continue copying sections in the spare storage device $108_S$ having bits indicating not copied. Sections of data may be copied in parallel to the potentially failed storage device $108_{PF}$ to reduce latency in the copy operation. If (at block 406) the section copy bitmap 214 indicates all sections of the spare storage device $108_S$ for the data in the storage array 106 have been copied to the potentially failed storage device $108_{PF}$ (indicated copy target 216), then the copy-in-progress flag 212 for the spare storage device $108_S$ is set (at block 408) to indicate not to copy.

A validation operation is then performed (at block 410) on the potentially failed storage device $108_{PF}$ having all the data from the spare storage device $108_S$ to determine if the potentially failed storage device $108_{PF}$ is an operational storage device. This validation operation may comprise determining that no error notifications were received while copying the data from the spare storage device $108_S$ or verify the copied data stored in the potentially failed storage device $108_{PF}$ is valid, i.e., matches the copied data on the spare storage device $108_S$, e.g., matches parity data, such as verifying during the copy operation. If (at block 412) the potentially failed storage device $108_{PF}$ is not validated, then the recovery manager 116 indicates (at block 414) the potentially failed storage device $108_{PF}$ as failed in the status 204 of the storage device information $200_S$ for the spare storage device $108_S$. Once indicated as failed, an administrator may be notified to remove and replace the failed storage device.

If (at block 412) the potentially failed storage device $108_{PF}$ is validated, then the potentially failed storage drive $108_{PF}$, having all the copied storage array 106 data, is swapped (at block 416) into the storage array 106 to replace the spare storage drive $108_S$. The swapped storage drive $108_{PF}$ is then immediately available for use because all the data from the spare storage drive it is replacing was copied. The storage device information $200_{PF}$ for the potentially failed storage device $108_{PF}$ is indicated (at block 418) as included in the storage array in the status 204 and storage array field 206 and the replaced spare storage device $108_S$ is indicated in status field 204 of the spare storage device information $200_S$ as a spare again. The command timeout period 210 is set (at block 420) to indicate a shorter period that elapses before non-response to a command is classified as a non-fatal timeout period.

Initially, before a storage device $108_i$ is replaced with a spare drive in the storage array 106, the command timeout period 210 is set to a longer time period to reduce the frequency at which timeout errors are determined by requiring a longer time to elapse. However, after the storage device $108_i$ is subject to a swapping and reconfiguration operation due to detected non-fatal errors, the timeout period 210 is reduced to increase the timeout period errors to consider whether to reconfigure or fail the drive.

With the embodiment of FIGS. 3 and 4, instead of removing a storage drive from a storage array 106 experiencing non-fatal errors, the potentially failed storage device $108_{PF}$ is replaced by a spare storage device $108_S$, and the potentially failed storage drive $108_{PF}$ is reconfigured to determine if it is still operational and useful, and may be returned to the storage array 106. This device recovery operation to determine if the potentially failed storage drive may be reused and reintroduced into the storage array 106 avoids discarding expensive storage devices when they may still be operable and be used in the storage array 106 and further conserves spare storage devices by returning the spare storage device to a spare status.

The described embodiments optimize the testing/validating of the potentially failed storage device $108_{PF}$ and expediting the return of the potentially failed storage device $108_{PF}$ to the storage array 106 to reduce wear on the spare storage device $108_S$ by copying the storage array data from the spare storage device $108_S$ to test the potentially failed storage device to test. Using the copied data to test whether the potentially failed storage device $108_{PF}$ provides a live test of the operability of the potentially failed storage device $108_{PF}$, where the copying used to validate potentially failed storage device $108_{PF}$ also results in the potentially failed storage device $108_{PF}$ being in a state ready for immediate return to the storage array 106 because it has the data from the spare storage device $108_S$ in the storage array 106.

Further, the described embodiments provide a non-fatal error threshold to allow for the reconfiguration and fixing of a storage device experiencing incidental non-fatal errors that may not reflect long term impairment. This is especially useful for high performance enterprise storage devices for a RAID array that are particularly expensive.

Yet further, described embodiments improve management of the storage (RAID) array by increasing the number of storage devices in an array that have a similar remaining lifespan. The spare storage device typically is a newer storage device that may have a significantly longer estimated remaining lifespan over the devices in the storage array that have experienced considerable use, especially in an enterprise environment. On the other hand, the potentially failed storage device has an estimated remaining lifespan similar to other storage devices in the storage array because it has been deployed in the storage array. By returning a potentially failed storage drive that has been validated and fixed to the storage array, the storage devices in the storage array return to having similar estimated remaining lifespans, because the swapped spare storage device likely has a much longer estimated remaining lifespan than other storage devices in the storage array.

Figure 5:
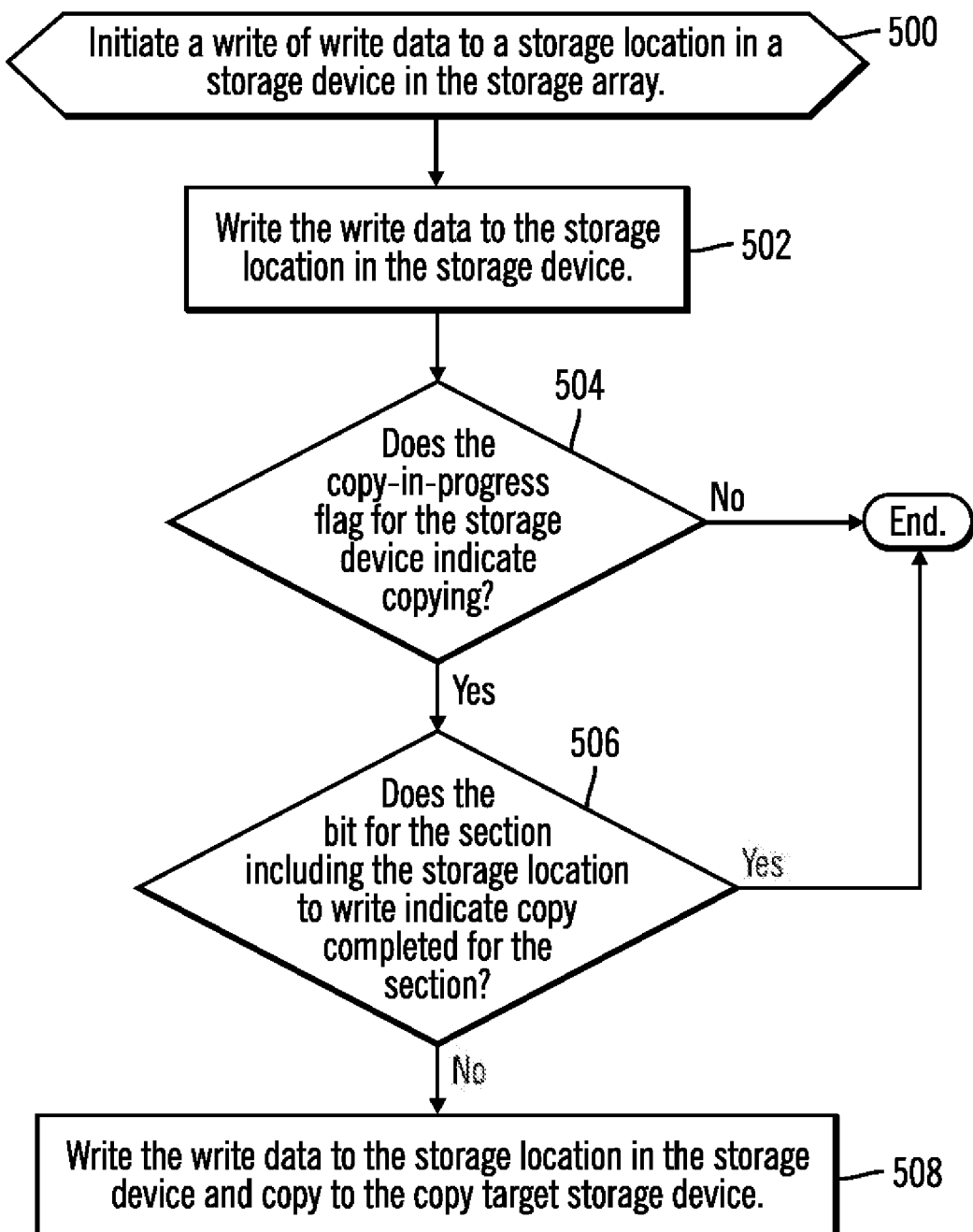
FIG. 5 illustrates an embodiment of operations to write data to a storage location of the replacement storage device swapped into the storage array being copied to the potentially failed storage device to recover.

FIG. 5 illustrates an embodiment of operations performed by the storage controller 104 I/O manager 114 to initiate a write of write data to a storage location in a storage array 106. The write may be part of a RAID stripping operation to stripe data, and parity calculated from the write data from the processor node 102, to the storage array 106. Upon initiating (at block 500) a write of write data to a storage location in a storage device $108_i$, the write data is copied to the storage location in the storage device $108_i$ in the array. A determination is made (at block 502) if the copy-in-progress flag 212 indicates that the storage device $108_i$ is being copied to a potentially failed storage device $108_{PF}$. If (at block 504) the copy-in-progress flag 212 field indicates no copying, then control ends. If (at block 504) the copy-in-progress 212 field indicates copying, then the I/O manager 114 determines (at block 506) whether the bit for the section in the storage device $108_i$ including the storage location to write indicates copy completed for the section.

If (at block 506) the bit indicates that the storage location was copied, then control end with the write data written to the storage location. If (at block 506) the bit indicates that the storage location was not copied, then the I/O manager 114 writes (at block 508) the write data to the storage location in the storage device $108_i$ and copies the write data to the copy target storage device 216 being recovered.

With the operations of FIG. 5, while recovering the potentially failed storage device $108_{PF}$, new writes to the replacement spare storage device $108_S$ in the storage array 106 are copied to the potentially failed storage device $108_{PF}$. This ensures that the potentially failed storage device $108_{PF}$ is made consistent with the replacement (spare) storage device currently in the storage array 106 to be ready to swap back into the storage array to replace the spare substituted for the potentially failed storage device with minimal downtime and latency.

The present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
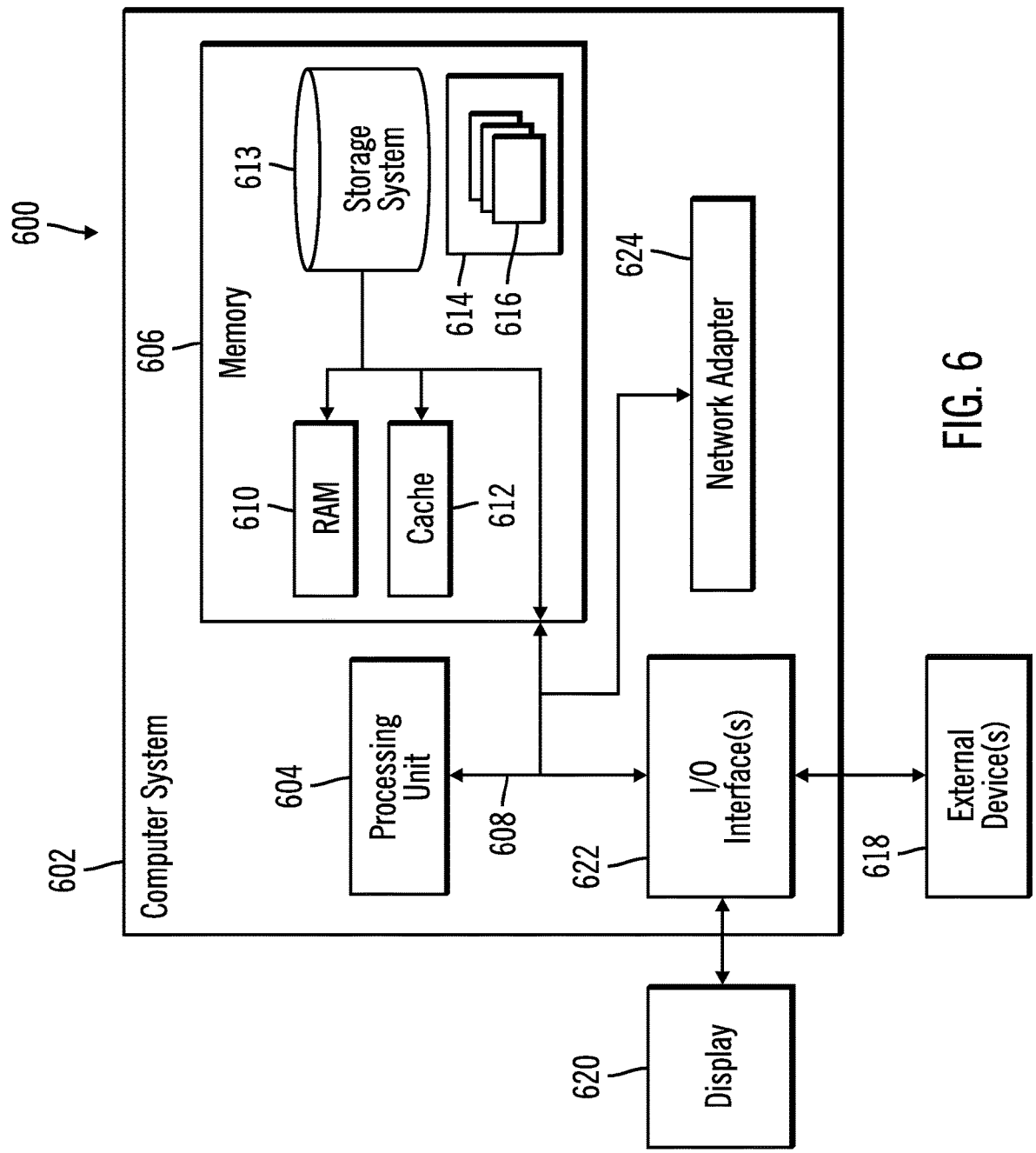
FIG. 6 depicts a computing environment in which the components of FIG. 1 may be implemented.

The computational components of FIG. 1, including the processor node 102 and storage controller 104, may be implemented in one or more computer systems, such as the computer system 602 shown in FIG. 6. Computer system/server 602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. The components of the computer 602 may be implemented as program modules 616 which generally carry out the functions and/or methodologies of embodiments of the invention as described herein. The systems of FIG. 1 may be implemented in one or more computer systems 602, where if they are implemented in multiple computer systems 602, then the computer systems may communicate over a network.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing storage devices in a storage array, the computer program product comprising a computer readable storage medium having computer readable program code embodied therein that is executable to perform operations, the operations comprising:
   determining to replace a first storage device in a storage array with a second storage device;
   rebuilding the storage array by including the second storage device in the storage array and removing the first storage device from the storage array resulting in a rebuilt storage array;
   copying data from the second storage device included in the rebuilt storage array to the first storage device;
   validating operability of the first storage device; and
   swapping the first storage device into the storage array to replace the second storage device in response to the validating the operability of the first storage device and the copying the data from the second storage device to the first storage device.

2. The computer program product of claim 1, wherein the second storage device is designated a spare to be available to replace a failed storage device in the storage array when included in the storage array to replace the first storage device, wherein the operations further comprise:
   indicating the second storage device as in use in the rebuilt storage array; and
   indicating the second storage device as a spare in response to the swapping the first storage device for the second storage device in the storage array.

3. The computer program product of claim 1, wherein the validating operability of the first storage device is carried out in response to copying the data from the second storage device.

4. The computer program product of claim 1, wherein the operations further comprise:
   detecting an error at the first storage device;
   determining whether the detected error comprises a fatal error from which the first storage device cannot be recovered or a non-fatal error from which the first storage device has an opportunity to be recovered;
   incrementing a number of non-fatal errors in response to determining that the detected error comprises a non-fatal error;

determining whether the number of non-fatal errors exceeds a non-fatal error threshold, wherein the determining to replace the first storage device in the storage array with the second storage device, the rebuilding the storage array, the copying data from the second storage device, the validating operability of the first storage device, and the swapping the first storage device into the storage array to replace the second storage device are performed in response to determining that the number of non-fatal errors is less than the non-fatal error threshold; and failing the first storage device in response to determining that the number of non-fatal errors is greater than the non-fatal error threshold.

5. The computer program product of claim 4, wherein a non-fatal error is detected by determining at least one of:

that a response to a command to the first storage device was not provided within a first timeout period in response to the first storage device not having been previously replaced in the storage array with a spare storage device; and that a response to a command to the first storage device was not provided within a second timeout period in response to the first storage device having been previously replaced in the storage array with a spare storage device; wherein the second timeout period is shorter than the first timeout period.

6. The computer program product of claim 1, wherein the operations further comprise:

reconfiguring the first storage device in response to removing the first storage device from the storage array, wherein the data is copied from the second storage device to the first storage device in response to reconfiguring the first storage device.

7. The computer program product of claim 6, wherein the reconfiguring the first storage device comprises:

maintaining an association of error types with different reconfiguration operations;

determining an error type of errors experienced at the first storage device; and determining a reconfiguration operation associated with the determined error type, wherein the reconfiguring the first storage device comprises performing the determined reconfiguration operation.

8. The computer program product of claim 1, wherein the copying data from the second storage device included in the rebuilt storage array to the first storage device comprises:

receiving a write with write data for a storage location in the second storage device configured in the storage array while copying data from the second storage device to the first storage device;

writing the write data to the storage location in the second storage device;

determining whether write data to write to the storage location was copied to the first storage device; and copying the write data to the first storage device in response to determining that the write data for the storage location was not copied to the first storage device.

9. The computer program product of claim 8, wherein the determining whether the data for the storage location was copied to the first storage device comprises:

maintaining a bitmap for sections of the second storage device indicating whether the sections have been copied to the first storage device; and setting a bit in the bitmap for a section of the second storage device to indicate copied in response to copying data from the section for the bit to the first storage device, wherein the write data is determined to have been copied to the first storage device in response to determining that the bit in the bitmap for the section including the write data indicates that the section has been copied to the first storage device.

10. The computer program product of claim 9, wherein the operations further comprise:

processing the bitmap to determine sections of data in the second storage device to copy to the first storage device for bits indicating that the data has not been copied, wherein write data is copied in response to determining that a bit for a section including the storage location for the write data indicates that the data was not copied.

11. The computer program product of claim 8, wherein the operations further comprise:

setting a copy-in-progress indicator to indicate to copy data from the second storage device to the first storage device in response to rebuilding the storage array by including the second storage device and removing the first storage device;

determining whether the copy-in-progress indicator indicates to copy data in response to receiving the write data, wherein the determining whether the data for the storage location was copied is performed in response to determining that the copy-in-progress indicator indicates to copy; and setting the copy-in-progress indicator to indicate not to copy data from the second storage device to the first storage device in response to copying all data to be copied in the second storage device to the first storage device.

12. The A computer program product for managing storage devices in a storage array, the computer program product comprising a computer readable storage medium having computer readable program code embodied therein that is executable to perform operations, the operations comprising:

determining whether a detected error at a first storage device is a fatal error or non-fatal error;

failing the first storage device in response to determining that the detected error is a fatal error; and in response to determining that the detected error is a non-fatal error, performing:

rebuilding the storage array by including a second storage device in the storage array and removing the first storage device from the storage array resulting in a rebuilt storage array;

copying data from the second storage device included in the rebuilt storage array to the first storage device; and swapping the first storage device into the storage array to replace the second storage device in response to copying the data from the second storage device to the first storage device.

13. A system for managing storage devices in a storage array, comprising:

a processor; and a computer readable storage medium having computer readable program code that in response to execution by the processor causes operations, the operations comprising:

determining to replace a first storage device in a storage array with a second storage device;

rebuilding the storage array by including the second storage device in the storage array and removing the first storage device from the storage array resulting in a rebuilt storage array;

copying data from the second storage device included in the rebuilt storage array to the first storage device;

validating operability of the first storage device; and swapping the first storage device into the storage array to replace the second storage device in response to the validating the operability of the first storage device and the copying the data from the second storage device to the first storage device.

14. The system of claim 13, wherein the second storage device is designated a spare to be available to replace a failed storage device in the storage array when included in the storage array to replace the first storage device, wherein the operations further comprise:

indicating the second storage device as in use in the rebuilt storage array; and indicating the second storage device as a spare in response to the swapping the first storage device for the second storage device in the storage array.

15. The system of claim 13, wherein the operations further comprise:

detecting an error at the first storage device;

determining whether the detected error comprises a fatal error from which the first storage device cannot be recovered or a non-fatal error from which the first storage device has an opportunity to be recovered;

incrementing a number of non-fatal errors in response to determining that the detected error comprises a non-fatal error;

determining whether the number of non-fatal errors exceeds a non-fatal error threshold, wherein the determining to replace the first storage device in the storage array with the second storage device, the rebuilding the storage array, the copying data from the second storage device, the validating operability of the first storage device, and the swapping the first storage device into the storage array to replace the second storage device are performed in response to determining that the number of non-fatal errors is less than the non-fatal error threshold; and failing the first storage device in response to determining that the number of non-fatal errors is greater than the non-fatal error threshold.

16. The system of claim 13, wherein the operations further comprise:

reconfiguring the first storage device in response to removing the first storage device from the storage array, wherein the data is copied from the second storage device to the first storage device in response to reconfiguring the first storage device.

17. The system of claim 13, wherein the copying data from the second storage device included in the rebuilt storage array to the first storage device comprises:

receiving a write with write data for a storage location in the second storage device configured in the storage array while copying data from the second storage device to the first storage device;

writing the write data to the storage location in the second storage device;

determining whether write data to write to the storage location was copied to the first storage device; and copying the write data to the first storage device in response to determining that the write data for the storage location was not copied to the first storage device.

18. The A system for managing storage devices in a storage array, comprising:

a processor; and a computer readable storage medium having computer readable program code that in response to execution by the processor causes operations, the operations comprising:

determining whether a detected error at a first storage device is a fatal error or non-fatal error;

failing the first storage device in response to determining that the detected error is a fatal error; and in response to determining that the detected error is a non-fatal error, performing:

rebuilding the storage array by including a second storage device in the storage array and removing the first storage device from the storage array resulting in a rebuilt storage array;

copying data from the second storage device included in the rebuilt storage array to the first storage device; and swapping the first storage device into the storage array to replace the second storage device in response to copying the data from the second storage device to the first storage device.

19. A method for managing storage devices in a storage array, comprising:

determining to replace a first storage device in a storage array with a second storage device;

rebuilding the storage array by including the second storage device in the storage array and removing the first storage device from the storage array resulting in a rebuilt storage array;

copying data from the second storage device included in the rebuilt storage array to the first storage device;

validating operability of the first storage device; and swapping the first storage device into the storage array to replace the second storage device in response to the validating the operability of the first storage device and the copying the data from the second storage device to the first storage device.

20. The method of claim 19, wherein the second storage device is designated a spare to be available to replace a failed storage device in the storage array when included in the storage array to replace the first storage device, further comprising:

indicating the second storage device as in use in the rebuilt storage array; and indicating the second storage device as a spare in response to the swapping the first storage device for the second storage device in the storage array.

21. The method of claim 19, further comprising:

detecting an error at the first storage device;

determining whether the detected error comprises a fatal error from which the first storage device cannot be recovered or a non-fatal error from which the first storage device has an opportunity to be recovered;

incrementing a number of non-fatal errors in response to determining that the detected error comprises a non-fatal error;

determining whether the number of non-fatal errors exceeds a non-fatal error threshold, wherein the determining to replace the first storage device in the storage array with the second storage device, the rebuilding the storage array, the copying data from the second storage device, the validating operability of the first storage device, and the swapping the first storage device into the storage array to replace the second storage device are performed in response to determining that the number of non-fatal errors is less than the non-fatal error threshold; and failing the first storage device in response to determining that the number of non-fatal errors is greater than the non-fatal error threshold.

22. The method of claim 19, further comprising:

reconfiguring the first storage device in response to removing the first storage device from the storage array, wherein the data is copied from the second storage device to the first storage device in response to reconfiguring the first storage device.

23. The method of claim 19, wherein the copying data from the second storage device included in the rebuilt storage array to the first storage device comprises:

receiving a write with write data for a storage location in the second storage device configured in the storage array while copying data from the second storage device to the first storage device;

writing the write data to the storage location in the second storage device;

determining whether write data to write to the storage location was copied to the first storage device; and copying the write data to the first storage device in response to determining that the write data for the storage location was not copied to the first storage device.

24. A method for managing storage devices in a storage array, comprising:

determining whether a detected error at a first storage device is a fatal error or non-fatal error;

failing the first storage device in response to determining that the detected error is a fatal error; and in response to determining that the detected error is a non-fatal error, performing:

rebuilding the storage array by including a second storage device in the storage array and removing the first storage device from the storage array resulting in a rebuilt storage array;

copying data from the second storage device included in the rebuilt storage array to the first storage device; and swapping the first storage device into the storage array to replace the second storage device in response to copying the data from the second storage device to the first storage device.

* * * * *